United States Patent [19]
Jones

[11] B 3,923,750

[45] Dec. 2, 1975

[54] PROCESS FOR PREPARING WHOLLY AROMATIC POLYAMIDES IN THE PRESENCE OF AN ARYL SULFONE

[75] Inventor: Rufus S. Jones, Dover, N.J.

[73] Assignee: Celanese Corporation, New York, N.Y.

[22] Filed: May 14, 1973

[21] Appl. No.: 360,208

[44] Published under the Trial Voluntary Protest Program on January 28, 1975 as document no. B 360,208.

[52] U.S. Cl. ........ 260/78 R; 260/47 CZ; 260/63 N; 260/65; 260/78 SC
[51] Int. Cl.² .......................................... C08G 69/28
[58] Field of Search .................................. 260/78 R

[56] References Cited
UNITED STATES PATENTS

| | | |
|---|---|---|
| 3,063,966 | 11/1962 | Kwolek et al. .................... 260/78 R |
| 3,329,653 | 7/1967 | Beavers et al. .................... 260/78 R |

*Primary Examiner*—Harold D. Anderson

[57] ABSTRACT

High molecular weight wholly aromatic linear polyamides of film and fiber-forming grade are prepared by direct condensation of monomeric aromatic dicarboxylic acids and aromatic diamines in about a mole to mole ratio in the presence of an aromatic sulfone. The condensation product can be further polymerized to film and fiber-forming viscosities either in the presence of the sulfone or in the solid state after the removal of the sulfone. The described process is particularly advantageous because it eliminates the previous requirement for condensation of derivatives of dicarboxylic acids to produce polyamides and provides the first commercially viable direct polymerization of wholly aromatic polyamides from aromatic dicarboxylic acids.

10 Claims, No Drawings

PROCESS FOR PREPARING WHOLLY AROMATIC POLYAMIDES IN THE PRESENCE OF AN ARYL SULFONE

INTRODUCTION

This invention relates to the production of aromatic polyamides and more particularly to the production of high molecular weight, linear fiber-forming wholly aromatic polyamides such as those which are the condensation product of isophthalic acid, terephthalic acid and meta and para phenylenediamines. These polyamides are more particularly described as polyparaphenylene terephthalamide, polymetaphenylene terephthalamide, polyparaphenylene isophthalamide, polymetaphenylene isophthalamide, analogs, copolymers and mixtures thereof.

BACKGROUND OF THE INVENTION

In recent years, considerable interest has been generated in wholly aromatic polyamides. A number of methods have been described for preparing such polymers but, in general, such methods have been undesirable in one or more respects. The most widely considered method for producing such polymers involves condensation of the corresponding aromatic acid chloride with the aromatic diamine.

Although commercially most polyamides are prepared by melt polymerization techniques involving high temperatures up to about 300°C, high molecular weight wholly aromatic polyamides of suitable color cannot be prepared by such melt polymerization techniques because the high temperatures required for melt polymerization foster reactions other than the desired amide formation so that only highly colored low molecular weight or cross-linked products are obtained. Other proposed methods such as the utilization of the acid chloride as the reactant present various undesirable features such as difficulty in preparing the reaction monomers, the production of undesirable by-products, some of which may act as polymerization inhibitors and the like.

Of the various other methods known for producing such polymers, each generally has serious shortcomings and is undesirable in one or more respects either because of the low relative yields, the multi-step reactions involved or the relatively high cost of reactants and/or monomeric starting materials. Such difficulties are substantially overcome by the present invention which provides the first commercially feasible direct condensation and polymerization route for wholly aromatic polyamides. Such method eliminates undesirable by-product formation, the preparation of special reactant monomers and the like thereby substantially improving economics.

THE INVENTION

In accordance with the invention, a method for preparing high molecular weight wholly aromatic polyamides is provided comprising heating in the substantial absence of oxygen an aromatic dicarboxylic acid and an aromatic diamine in about a mole to mole ratio in the presence of an aryl sulfone to a temperature above the melting point of said sulfone to just below the decomposition temperature of the reactants and continuing said heating with the removal of condensation by-products for a period of time sufficient to form a product having an inherent viscosity of at least 0.4 as measured using a solution of 0.4 grams of product per 100 milliliters of concentrated aqueous sulfuric acid (97 – 99 percent by weight) at 25°C.

The polymer is preferably further polymerized to an inherent viscosity within the range of 1.0 to 5.0 with or without an intermediate step comprising the separation of the sulfone from the reaction product. If such a separation step is utilized, the product can be further polymerized under solid state conditions either with or without a heat transfer diluent at temperatures in excess of 300°C but below the decomposition temperature of the polymer.

DETAILS OF THE INVENTION

In the most preferred embodiment of the invention, the monomeric materials are condensed first to an oligomer and subsequently polymerized to a high polymer fiber-forming and film-forming viscosity. The monomers are preferably dicarboxylic acids of the formula $HOOCArCOOH$, and diamines of the formula $H_2NArNH_2$ wherein Ar is selected from the group consisting of meta and para

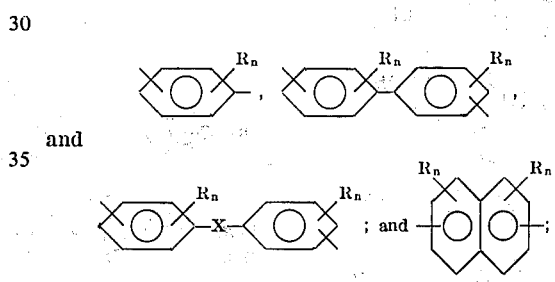

and and mixtures thereof wherein R is any mono functional substituent inert under the reaction conditions, n is an interger of 0 to 4, X is —O—,

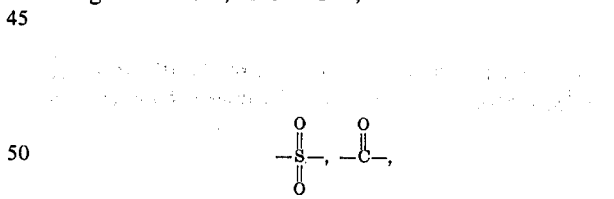

cycloalkydene of up to 8 carbon atoms or $CY_2$, wherein C is carbon and Y is hydrogen, mononuclear aryl or alkyl of 1 to 6 carbon atoms. The most preferred dicarboxylic acids are terephthalic acid, isophthalic acid and mixtures thereof. The most preferred diamines utilized in the reaction are paraphenylenediamine, metaphenylenediamine and mixtures thereof. While the preferred dicarboxylic acids and diamines produced the most desired film and fiber-forming properties, certain variations in such properties as well as entirely different properties can be realized by using other dicarboxylic acids as reactants such as the following, all of which are within the present invention.

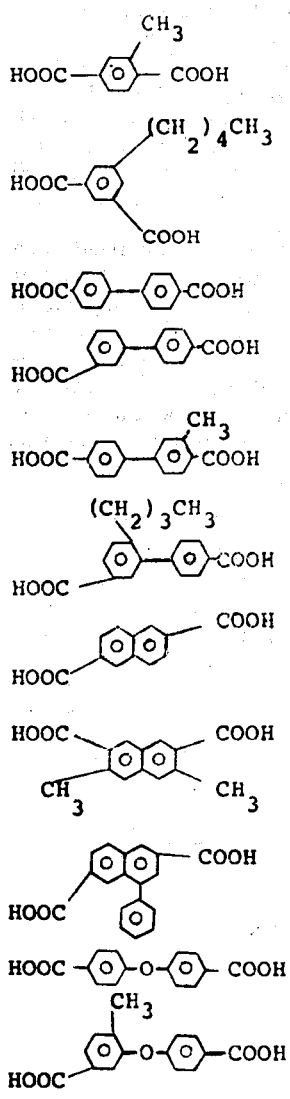
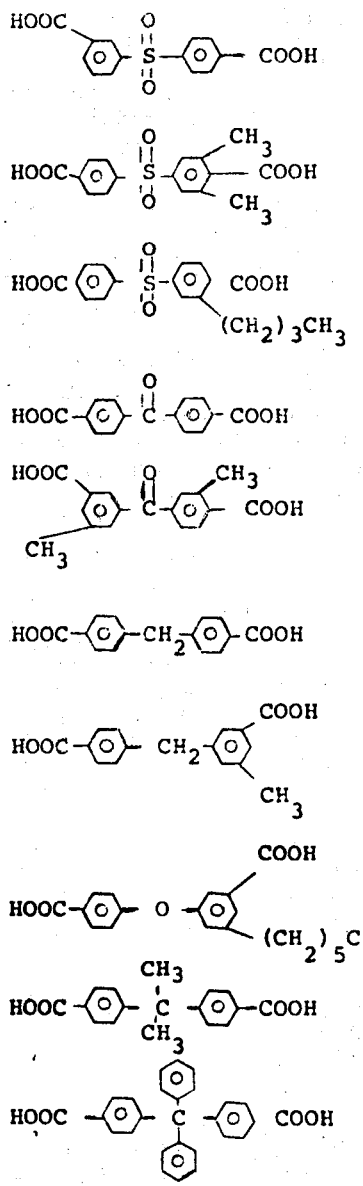
Although the diamine reacted with the dicarboxylic acid is preferably meta or para phenylene diamine, certain other aromatic diamines such as the following can be used with correspondingly good results.
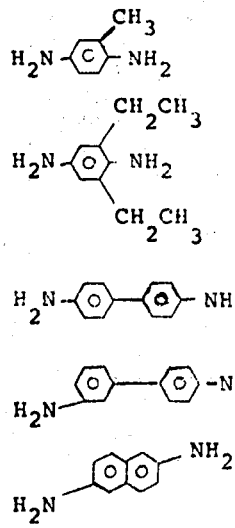
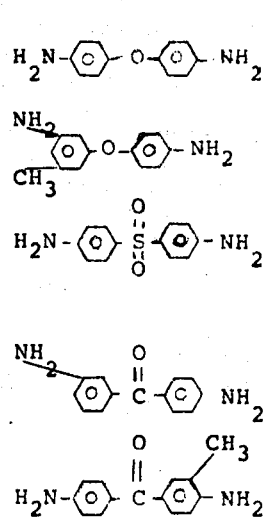

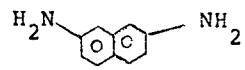
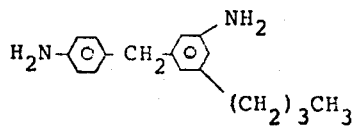
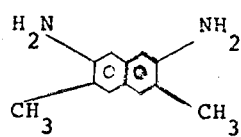
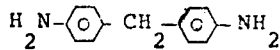
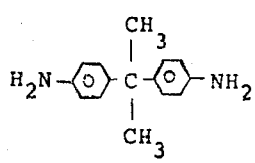
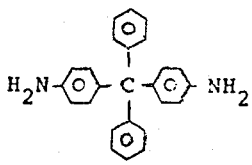
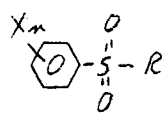

The aryl sulfone is of the formula $$\underset{O}{\overset{X_n \quad O}{\underset{\|}{\bigcirc}}-\overset{\|}{\underset{\|}{S}}-R}$$

wherein X is hydrogen, aryl, alkyl or alkoxy of 1 to 6 carbon atoms, n is 1 to 3, R is $$\overset{X_n}{\bigcirc}$$

or alkyl of 1 to 12 carbon atoms. The sulfones used herein are liquid at the monomer condensation temperature and do not decompose at the elevated temperatures utilized. Superatmospheric pressures can be utilized if desired if the sulfone tends to volatilize at the desired reaction temperature. Typical of the sulfones used in the present invention include diphenylsulfone, methylphenylsulfone, butylphenylsulfone merely increase the amount of sulfone to separate from the polymer and recover after the condensation.

The aromatic dicarboxylic acid and aromatic diamine are preferably reacted in a mole to mole ratio. Such reaction ratio, however, can be varied to utilize up to about a 2 mole percent excess of one reactant depending on the particular properties desired in the resulting polymer. For instance, it is sometimes considered desirable to have a low proportion of carboxylic end groups. A slight excess of diamine will aid in this result. For other uses, a low ratio of amine end groups may be desired and, thus, a corresponding small molar excess of dicarboxylic acid is used. Large excesses of one reactant, unless compensated for in the reaction, tend to limit the molecular weight of the resulting polymer and thus may not provide the more desirable film and fiber-forming viscosities.

In reacting the aromatic dicarboxylic acid with the aromatic diamine, a condensation reaction takes place with the elimination of water. The acid group reacted with the diamine amino group to form an amide group. Continuing the condensation, amide oligomers are formed which on further heating at elevated tempera-

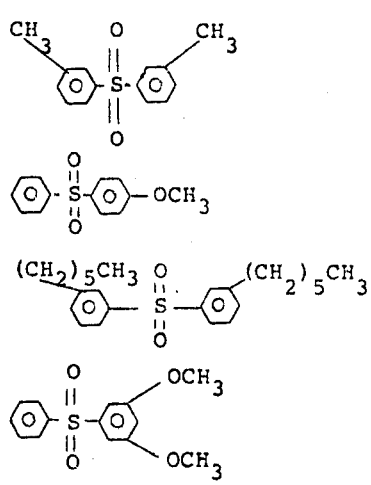
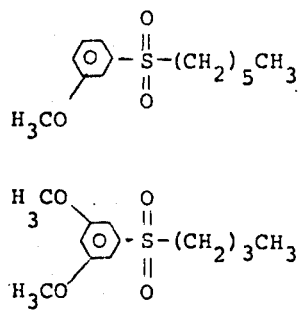

The aryl sulfone is used in an amount corresponding to 100 to 2500 weight percent and more preferably 300 to 1500 weight percent of the polymer. The preferred amount is that which is sufficient to partially solubilize the monomer reactants at the reaction temperature. Excessive amounts are generally of no benefit and tures polymerize to long-chain linear polymers of film and fiber-forming viscosities. During the condensation reaction, the volatilized by-product, water, is preferably removed as it is formed so as to enhance the reaction. if superatmospheric pressures are used in the condensation stage, then it is preferred to continuously or periodically bleed reaction by-product off from the reaction mixture.

The condensation reaction proceeds readily under the influence of heat and temperatures above the melting point of the sulfone and at least above 100°C. No catalyst is required although such could be used if desired. At temperatures above about 150°C to about 400°C, the condensation reaction proceeds at a desirable reaction rate. The upper temperature range is generally limited by the boiling point of the sulfone unless superatmospheric pressure is used. The temperature is preferably increased over the noted temperature range beginning with consideration being given to the volatility of the reactants. As the condensation reaction proceeds, the temperature is preferably increased to sustain a desirable reaction rate. Excessive rapid heating to the higher temperatures may result in a tendency of the monomer reactants to sublime and/or distill from the reaction mixture. Where it is desirable to control such sublimation and distillation, superatmospheric pressure can be imposed.

The temperature to which the reactants are initially heated is limited on the lower range by the melting point of the sulfone. The sulfone acts as a solvent for the reactants and, therefore, the process does not proceed in the desired manner until the sulfone is liquefied under the influence of heat. At the same time, the boiling point of the sulfone tends to limit the upper temperature range at which the condensation reaction is carried out. Of course, this upper temperature range can be extended by the imposition of superatmospheric pressure.

With the preferred diphenylsulfone, liquefaction takes place in the temperature range of 128° to 129°C at atmospheric pressure. The boiling point of diphenylsulfone is 379°C which adequately encompasses the preferred temperatures for condensation. The other sulfones described herein likewise have ample liquid temperature ranges well within the desired condensation reaction temperatures.

The reaction is continued until the condensation product has an inherent viscosity of at least 0.4 as measured in a solution of 0.4 grams of polymer per 100 milliliters of concentrated sulfuric acid at 25°C. With the preferred sulfones, inherent viscosities in excess of 1.0 are readily obtained.

Inherent viscosities ($\eta$inh) are determined in accordance with the following equation $$\eta\text{inh} = \ln \eta \text{ rel}/C$$

The relative viscosity ($\eta$ rel) is determined by dividing the flow time in a capillary viscometer of a dilute solution of the polymer by the flow time for the pure solvent. The concentration (C) is 0.4 grams of polymer per 100 cc. of concentrated (97 to 99 percent) aqueous sulfuric acid.

On completion of the condensation, the polymer is preferably polymerized to a viscosity in the range of 1.0 to 5.0. This polymerization can be effected by continued heating of the condensation product while still in the presence of the sulfone. Alternatively, the sulfone can be separated from the polymer and the polymerization continued in solid state form at temperatures in excess of the boiling point of the sulfone. Continued polymerization is preferably carried out at temperatures in excess of 350°C up to just below the decomposition temperature of the polymer. Such polymers are known for their high decomposition temperatures which are in the vicinity of about 470°C depending upon the particular polymer. Therefore, it is particularly desirable for the fastest polymerization rates to utilize temperatures in the range of about 400° to 470°C.

The condensation and polymerization reaction is preferably carried out under a blanket of inert gas such as nitrogen, neon, argon, kyrpton and the like to thereby reduce oxidation products and degradation of the polymer. These reactions are conveniently carried out under atmospheric pressure. However, super and sub atmospheric pressures can be utilized as set forth herein if desired. Subatmospheric conditions can be conveniently utilized primarily after the formation of the oligomer such as to aid in the removal of volatile by-products from the reaction mixture. When superatmospheric pressure is utilized, such as when the sulfone boils below the desired reaction temperature, it is highly desirable to periodically remove low boiling condensation products such as water by distillation to avoid inhibiting further reaction.

While the sulfone acts as a solvent for monomeric material, there are occasions wherein a further diluent is desirably used which also acts as a solvent for the diamine monomers and/or as a heat transfer agent. The diluent, of course, is chosen for its properties of inertness under the reaction conditions, compatibility with the sulfone, boiling point, solubilizing properties of the monomer reactants, specific heat properties and the like. Diluents which boil at temperatures below the reaction temperatures can be used provided superatmospheric pressures are imposed. Diluents which are only solvents for the monomer provide easy separation of the polymer therefrom as the polymer is precipitated from the solution. In addition, such diluents are solvents for the sulfone, and serve to liquefy the reaction mixture at room temperature, thereby providing ease of handling. Advantages and disadvantages can be found for each type of diluent.

Diluents which do not act as a solvent for the polymer and which are desirably used herein include, but are not limited to, aromatic hydrocarbons such as toluene, xylene, polymethylbenzenes, ethylbenzene, the polyethylbenzenes, cumene, naphthalene, the methylnaphthalenes such as alphamethyl naphthalene and beta methyl naphthalene, acenaphthene, polymethylnaphthalenes, biphenyl, diphenylmethane, aliphatic and cycloaliphatic hydrocarbons such as cosane, heptadecane, tetrahydronaphthalene, decahydronaphthalene, relatively high boiling petroleum hydrocarbon fractions such as kerosenes and gas oils, ethers such as diphenylether and ditolyl ether.

The diluent can be used in an amount ranging from about 50 to 1500 percent based on the weight of the polymer. The higher proportions of this range are preferably used with diluents which act as solvents for the polymer such that workable viscosities are obtained. The lower portion of this range, i.e., 50 to about 300 percent, is preferably used with the nonsolvent diluents and/or under conditions where the diluent is removed from the reaction prior to the completion of the polymerization stage. Such removal can be accomplished by filtering, evaporating, stream stripping and the like.

Alternatively, a diluent need not be utilized in the condensation reaction because the sulfone acts as such for the polymer. However, on completion of the condensation and wherein the polymerization is desirably furthered after the separation of the sulfone from the polymer, such diluents can be added and used primarily as heat transfer agents or as solvents for the polymer on further polymerization.

As has been pointed out, the diluent can be retained with the reactants through the completion of the polymerization. Alternatively, the diluent can be removed after the condensation of the monomers to an oligomer stage. It is to be noted, however, that many of the diluents useful herewith perform the valuable additional functions of a heat transfer agent in further solid state polymerizations and of solvent for the sulfone, thereby simplifying the separation of polymer from the sulfone.

The resulting polymer is particularly useful in the preparation of fibers, films and fibrils by wet or dry spinning and the like extruding techniques. In the spinning or shaping of the polymer into a fiber, film or like structure, it is preferable to have an inherent viscosity of at least above about 0.7 and more preferably above 1.0 as higher inherent viscosities generally contribute to higher fiber strength.

Polymers of the present invention can be shaped from solutions of sulfuric acid, preferably of a concentration of 95 – 100 percent, oleum, i.e., sulfuric acid containing up to 20 percent or higher free $SO_3$, hydrofluoric acid and other suitable strong inorganic acids, and organic solvents such as tetramethylurea, N,N-dimethylacetamide, N,N-dimethylisobutylamide, 1,3-dimethylimidazolidinone-2, N-methylpyrrolidone-2, hexamethylphosphoramide and the like.

The invention will be more fully described by reference to the examples which illustrate certain preferred embodiments of the invention. Unless otherwise indicated, all parts and percentages in the examples and claims are by weight.

EXAMPLE 1

Polyparaphenyl terephthalamide was produced in accordance with the present invention by charging to a reactor 5.41 parts of paraphenylenediamine, 8.31 parts of terephthalic acid, 100 parts of diphenylsulfone and 100 parts of paraxylene. The reaction vessel was then flushed with nitrogen and evacuated several times to remove oxygen. Heating was commenced with stirring under atmospheric pressure and nitrogen flow to a temperature of 155°C at which time distillation commenced. Heating was continued and the temperature increased to 300°C over a period of thirty minutes at which time water of condensation was noted in the distillation column. The temperature was further increased to 376°C and maintained at that temperature for 15 hours. The product was then cooled and the diphenylsulfone extracted into acetone. After washing several times with warm acetone, the resulting product was vacuum dried at 80°C. 11.2 parts of paraphenylene terephthalamide product was recovered having an inherent viscosity of 1.28 in concentrated sulfuric acid.

The resulting polymer could be spun into fibers or formed into films or alternatively further polymerized in the solid state in the presence of 200 weight percent, based on the polymer, of diphenylether at a temperature of 400°C until an inherent viscosity of 2.5 is reached.

EXAMPLE 2

Polyparaphenylene terephthalamide was again produced in accordance with the present invention by reacting equal molar amounts of paraphenylenediamine and terephthalic acid. The reaction was carried out by charging 5.41 parts of paraphenylenediamine, 8.31 parts of terephthalic acid and 100 parts of diphenylsulfone. The reactor was purged with nitrogen to remove oxygen. Heating was commenced under a nitrogen blanket. As the temperature approached 328°C, water was detected distilling from the reaction mixture. The temperature was increased to 376°C and maintained at that temperature for 3 ⅓ hours. The resulting product was then cooled and the diphenylsulfone separated by dissolving the same with acetone and filtering. The filtrate was washed several times with warm acetone. The recovered polymer was then dried in a vacuum oven at 80°C. 11.5 parts of polymer was recovered having an inherent viscosity of 1.11 in concentrated sulfuric acid.

The powdered polymer is further polymerized in the solid state in the presence of 200 weight percent, based on the polymer, of diphenylether at a temperature of 430°C until an inherent viscosity of 2.5 is obtained.

In the same manner, the corresponding polyparaphenylene isophthalamide, the polymetaphenylene terephthalamide, polymetaphenylene isophthalamide and mixtures thereof are condensed and polymerized to inherent viscosities of at least 0.4 and more preferably above 1.0. Additionally, other aromatic sulfones as described herein are utilized with correspondingly good results. The sulfones are conveniently recovered on completion of the reaction and reused in subsequent condensations.

While there have been described more particularly the preferred embodiments of the present invention particularly with respect to the condensation and polymerization of the most preferred polymer, polyparaphenylene terephthalamide, it will be readily recognized by those skilled in the art that the various other wholly aromatic polyamides described herein are polymerized in the same manner with correspondingly good results. As such, it is intended to cover the invention broadly being limited only by the following claims.

What is claimed is:

1. A method for preparing high molecular weight wholly carbocyclic aromatic polyamides comprising heating in the substantial absence of oxygen a carbocyclic aromatic dicarboxylic acid and a carbocyclic aromatic diamine in about a mole to mole ratio in the presence of an aryl sulfone to a temperature above the melting point of said sulfone to just below the decomposition temperature of the reactants, and continuing said heating with the removal of condensation by-products for a time sufficient to form a polymer having an inherent viscosity of at least 0.4 as measured using a solution of 0.4 grams of product per 100 milliliters of concentrated aqueous sulfuric acid, 97–99 percent by weight, at 25°C., said aryl sulfone being present in an amount corresponding to 100 to 2500 weight percent of the polymer.

2. The method of claim 1 wherein on completion of the reaction, the sulfone is separated from the resulting product.

3. The method of claim 2 wherein the resulting product is further polymerized under solid state conditions to increase the inherent viscosity to a value in the range of 1.0 to 5.0.

4. The method of claim 3 wherein the resulting product is further polymerized in the presence of a nonreactive liquid hydrocarbon diluent at an elevated temperature in excess of 350°C. up to just below the decomposition temperature of said polymer.

5. The method of claim 1 wherein the dicarboxylic acid is of the formula HOOCArCOOH and the diamine is of the formula H$_2$NArNH$_2$ wherein Ar is selected from the group consisting of meta and para

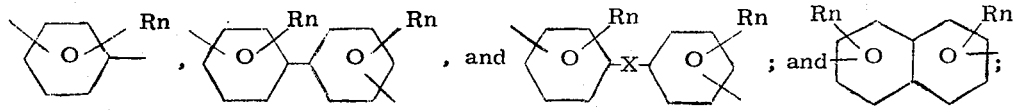

and mixtures thereof wherein R is any monofunctional substituent inert under the reaction conditions, $n$ is an integer of 0 to 4, X is —O—,

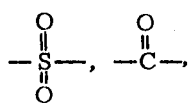

cycloalkylidene of up to 8 carbon atoms, or CY$_2$ wherein C is carbon and Y is hydrogen, mononuclear aryl or alkyl of 1 to 6 carbon atoms.

6. The method of claim 5 wherein the dicarboxylic acid is selected from the group consisting of terephthalic acid, isophthalic acid and mixtures thereof.

7. The method of claim 5 wherein the diamine is selected from the group consisting of metaphenylenediamine, paraphenylenediamine and mixtures thereof.

8. The method of claim 1 wherein a nonreactive diluent is present in addition to the sulfone in an amount of 50 to 1500 percent based on the weight of the polymer.

9. The method of claim 1 wherein the aryl sulfone is of the formula

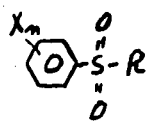

wherein X is hydrogen, aryl, alkyl or alkoxy of 1 to 6 carbon atoms, $n$ is 1 to 3 and R is

or alkyl of 1 to 12 carbon atoms.

10. the method of claim 9 wherein the sulfone is diphenyl sulfone.

* * * * *